(12) United States Patent
Shin

(10) Patent No.: US 11,223,256 B2
(45) Date of Patent: Jan. 11, 2022

(54) HYBRID GENERATOR

(71) Applicant: ORA CO., LTD., Pocheon-si (KR)

(72) Inventor: Young San Shin, Seoul (KR)

(73) Assignee: ORA CO., LTD., Pocheon-si (KR)

( * ) Notice: Subject to any disclaimer, the term of this patent is extended or adjusted under 35 U.S.C. 154(b) by 460 days.

(21) Appl. No.: 16/322,600

(22) PCT Filed: Aug. 2, 2016

(86) PCT No.: PCT/KR2016/008531
§ 371 (c)(1),
(2) Date: Feb. 1, 2019

(87) PCT Pub. No.: WO2018/026029
PCT Pub. Date: Feb. 8, 2018

(65) Prior Publication Data
US 2021/0288551 A1    Sep. 16, 2021

(30) Foreign Application Priority Data
Aug. 2, 2016 (KR) .................... 10-2016-0098462

(51) Int. Cl.
*H02K 7/18* (2006.01)
*H02K 7/08* (2006.01)
*F03B 3/04* (2006.01)
*F03B 13/10* (2006.01)
*F03D 9/25* (2016.01)

(52) U.S. Cl.
CPC ........... *H02K 7/1807* (2013.01); *H02K 7/085* (2013.01); *F03B 3/04* (2013.01); *F03B 13/10* (2013.01); *F03D 9/25* (2016.05); *F05B 2220/706* (2013.01)

(58) Field of Classification Search
CPC . H02K 7/085; F03B 3/04; F03B 13/10; F03D 9/25

USPC ....................................................... 290/43, 54
See application file for complete search history.

(56) References Cited

U.S. PATENT DOCUMENTS

| 2008/0088132 A1* | 4/2008 | Laube von Laubenfels ............... F03B 13/14 290/53 |
| 2009/0267347 A1* | 10/2009 | Abatemarco ........... F03B 13/10 290/43 |
| 2013/0140823 A1* | 6/2013 | Henry ..................... F03B 13/20 290/53 |

FOREIGN PATENT DOCUMENTS

| JP | 58-064867 U | 5/1983 |
| KR | 10-1455053 B1 | 10/2014 |
| WO | 2012/035610 A1 | 3/2012 |

OTHER PUBLICATIONS

International Search Report for PCT/KR2016/008531 dated Apr. 18, 2017 [PCT/ISA/210].

(Continued)

*Primary Examiner* — Charles Reid, Jr.
(74) *Attorney, Agent, or Firm* — Sughrue Mion, PLLC

(57) ABSTRACT

The present invention discloses a hybrid generator. The hybrid generator according to one embodiment of the present invention includes a housing having an empty space through which a fluid flows; a rotor received inside the housing, rotated by a fluid flowing inside the housing, and having a magnet; and a stator coupled between the housing and the rotor, surrounding the rotor, and having at least one coil. According to the present invention, the rotor includes a rotating shaft having a first blade on the outer circumferential surface thereof, and further includes a second blade detachably coupled to the rotating shaft.

17 Claims, 17 Drawing Sheets

(56) References Cited

OTHER PUBLICATIONS

Korean Notice of Allowance for PCT/KR2016/008531 dated Apr. 18, 2017.

* cited by examiner

HYBRID GENERATOR

CROSS-REFERENCE TO RELATED APPLICATIONS

This application claims priority to Korean Patent Application No. 10-2016-0098462, filed on Aug. 2, 2016 in the Korean Intellectual Property Office, the disclosure of which is incorporated herein by reference.

TECHNICAL FIELD

The present invention relates to a hybrid generator, and more particularly, to a hybrid generator capable of generating electric energy from natural energy. According to the present invention, when the generator of the present invention is installed in an area where hydropower is present, the angle of the blade of the generator may be adjusted by hydraulic force, and at the same time, the blade may be effectively rotated to generate electric energy. In addition, when the generator is installed in an area where hydropower is absent, the generator may be equipped with an additional blade that is effectively rotated by wind power, and thus may convert wind power into electric energy. Therefore, the hybrid generator of the present invention may efficiently acquire electric energy from a variety of natural energy sources.

BACKGROUND ART

Examples of typical power generation methods include hydroelectric power generation, thermal power generation, nuclear power generation, and the like. These power generation methods require large-scale power generation facilities. In particular, in the case of thermal power generation, a large amount of petroleum or coal must be supplied to operate power generation facilities. However, due to limited reserves and environmental pollution caused by combustion of fossil fuels, the use of fossil fuels may be challenging.

In addition, thermal power generation causes air pollution, and nuclear power generation has serious problems such as radiation leaks and nuclear waste disposal. Therefore, there is a growing need for a less expensive and safer power generation method than the conventional power generation methods.

In the case of hydroelectric power generation, when a waterwheel is rotated by falling or flowing of water, rotational force is transmitted to a generator coupled to the axis of the waterwheel, so that electricity may be generated. Compared to thermal power generation and nuclear power generation, hydroelectric power generation is environmentally friendly and can supply high quality power at low operation cost.

In addition, in the case of wind power generation, wind energy generated in the atmosphere is converted into mechanical energy using a rotary blade, and the converted mechanical energy is converted into electric energy. Like hydroelectric power generation, wind power generation is environmentally friendly and can supply high quality power at low operation cost.

In addition, a solar cell is a photocell designed to convert sunlight into electric energy, and may be composed of semiconductor devices that convert light energy emitted from the sun into electric energy. In particular, a solar cell may convert sunlight into electric energy using semiconducting properties, and may convert energy contained in ultraviolet and visible light into electricity. However, it is difficult to collect solar energy at high density because solar energy varies greatly depending on regions, seasons, day length, weather, and the like.

In addition, conventional generators that generate electricity using only one of hydropower and wind power are less efficient in terms of energy generation. To solve this problem, hydropower and wind power may be used at the same time. However, in this case, installation costs are increased because both a hydroelectric power generator and a wind power generator must be installed.

DISCLOSURE

Technical Problem

The present invention is directed to providing a hybrid generator capable of performing wind power generation and hydroelectric power generation. According to the present invention, when the hybrid generator is used to generate electric energy in an area where hydropower is absent, a blade may be additionally coupled to the hybrid generator to generate electric energy using wind power. On the other hand, when the hybrid generator is used to generate electric energy in an area where hydropower is present, the blade for wind power generation may be separated from the hybrid generator. Therefore, the hybrid generator may efficiently generate electric energy using wind power or hydropower.

In addition, the hybrid generator of the present invention may be provided with a plurality of solar cells that convert solar energy into electric energy. Thus, in addition to wind power generation and hydroelectric power generation, the hybrid generator may use sunlight to generate electric energy. Therefore, the hybrid generator of the present invention may efficiently generate electric energy in various environments.

Technical Solution

One aspect of the present invention provides a hybrid generator including a housing having an empty space through which a fluid flows; a rotor received inside the housing, rotated by a fluid flowing inside the housing, and having a magnet; and a stator coupled between the housing and the rotor, surrounding the rotor, and having at least one coil, wherein the rotor includes a rotating shaft having a first blade on the outer circumferential surface thereof, and further includes a second blade detachably coupled to the rotating shaft.

In addition, the housing may include an upper housing and a lower housing detachably coupled to the upper housing.

In addition, an auxiliary housing may be coupled to the side of the housing, and the auxiliary housing may be provided with a battery that stores induced current generated by rotation of the rotor and an inverter that converts the induced current stored in the battery into alternating current.

In addition, the upper and lower housings may be coupled by a coupling member.

In addition, a sealing member made of an elastic material may be coupled between the upper and lower housings, and the upper and lower housings may have a fitting groove into which the sealing member is fitted.

In addition, a first rotating bearing may be provided between the upper housing and the rotating shaft to support one side of the rotating shaft, and a second rotating bearing may be provided between the lower housing and the rotating shaft to support the other side of the rotating shaft.

In addition, planetary gears may be coupled to the rotating shaft, a ring gear that transmits rotational driving force to the planetary gears is further coupled to the rotating shaft, and the rotating shaft, the planetary gears, and the ring gear are simultaneously driven to control the rotation speed of the rotating shaft.

In addition, at least one solar cell may be provided in the upper and lower housings.

In addition, the first blade may be rotatably coupled to the rotating shaft, and the rotating shaft may include a first rotary member moved by the pressure of a fluid flowing into the housing and a second rotary member having one side coupled to the first rotary member and the other side coupled to the first blade.

In addition, the hybrid generator may further include a first ball joint coupled between the first and second rotary members and a second ball joint coupled between the second rotary member and the first blade, wherein a blade rotating shaft coupled to the second ball joint may be provided at one end of the first blade.

In addition, a spring may be coupled between the second rotary member and the rotating shaft.

In addition, a support bearing may be coupled between the first blade and the rotating shaft to support rotation of the first blade.

In addition, the second ball joint may be engaged at a position eccentric from the center of the cross section of the blade rotating shaft.

In addition, when the second ball joint is coupled to an upper side with respect to the center of the cross section of the blade rotating shaft, the rotation angle of the first blade may be increased when the second rotary member is moved vertically downward, and when the second ball joint is coupled to a lower side with respect to the center of the cross section of the blade rotating shaft, the rotation angle of the first blade may be decreased when the second rotary member is moved vertically downward.

In addition, a coupling member to which the second blade is coupled may be further provided at one end of the rotating shaft.

In addition, the magnet may be coupled to the periphery of the first blade, and may be disposed to be inclined at a predetermined angle with respect to the coil.

In addition, a charging terminal extending outside the housing may be further provided on one side of the housing.

In addition, the charging terminal may be provided at least as a USB port, and the hybrid generator may be connected to an auxiliary battery or an energy storage system (ESS) via the USB port and energy generated in the hybrid generator may be stored in the auxiliary battery or the energy storage system (ESS).

In addition, the charging terminal may be provided with two electrode wires and at least one wire for preventing disconnection of the electrode wires.

In addition, the hybrid generator may further include a case in which the housing is received, wherein the case may be provided with a case solar cell, and a buoyant member for imparting buoyancy to the case may be separately provided or the case may be used as a buoyant member.

In addition, when the housing is brought into close contact with the lower portion of the case to perform hydroelectric power generation, the first blade may be rotated by a fluid flowing into the housing when the case floats on water, and a plurality of wires may be coupled to the housing to prevent the housing from being swept away by water.

Another aspect of the present invention provides a hybrid generator including a housing having an empty space through which a fluid flows; a first rotor received inside the housing, provided with a first rotating shaft having a first blade on the outer circumferential surface thereof, rotated by a fluid flowing inside the housing, and having a magnet; a stator coupled between the housing and the first rotor, surrounding the first rotor, and having at least one coil; and a second rotor provided outside the housing, detachably coupled to the first rotating shaft, provided with a second rotating shaft having a second blade on the outer circumferential surface thereof, and rotated by a fluid flowing outside the housing, wherein the housing includes an upper housing and a lower housing detachably coupled to the upper housing.

Advantageous Effects

The hybrid generator of the present invention can generate electric energy from environmentally friendly natural energy such as hydropower or wind power and supply the generated electric power to the outside.

In addition, since a supporter is provided on one side of the housing of the hybrid generator, the height and angle of the hybrid generator can be adjusted when generating electric energy through hydroelectric power generation or wind power generation. Therefore, the hybrid generator can efficiently generate electric energy at an optimum position.

In addition, the electric energy generated through hydroelectric power generation or wind power generation can be stored in an auxiliary battery or an energy storage system (ESS), and the stored electric energy can be used according to purposes.

In addition, when the hybrid generator of the present invention is used, the quality of energy sources can be improved, thereby stabilizing the supply and demand of electric power, and the investment cost of power plant facilities can be reduced.

In addition, the hybrid generator of the present invention uses a natural phenomenon such as water flow or air flow, without using fossil fuels. Therefore, the hybrid generator can generate clean energy that does not cause environmental pollution.

MODES OF THE INVENTION

Hereinafter, specific embodiments of the present invention will be described in detail with reference to the drawings. However, the scope of the present invention is not limited to the embodiments, and the scope of the present invention may be differently proposed by addition, modification, and deletion of constituent elements constituting the embodiments, but such addition, modification, and deletion are also within the scope of the present invention.

Figure 1:
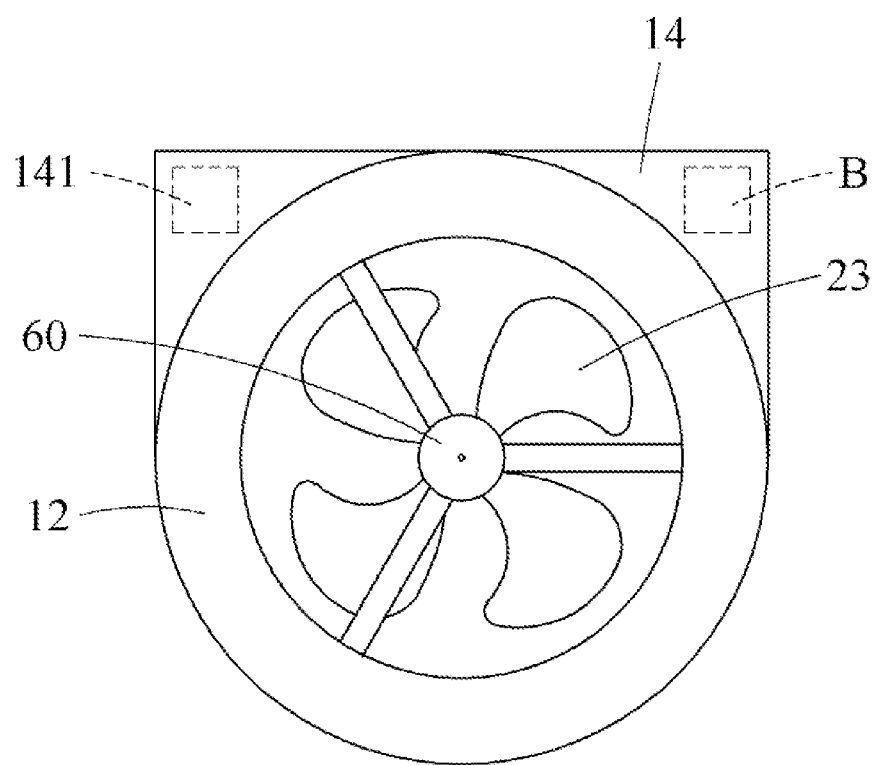
FIG. 1 is a front view of a hybrid generator according to one embodiment of the present invention.
Figure 2:
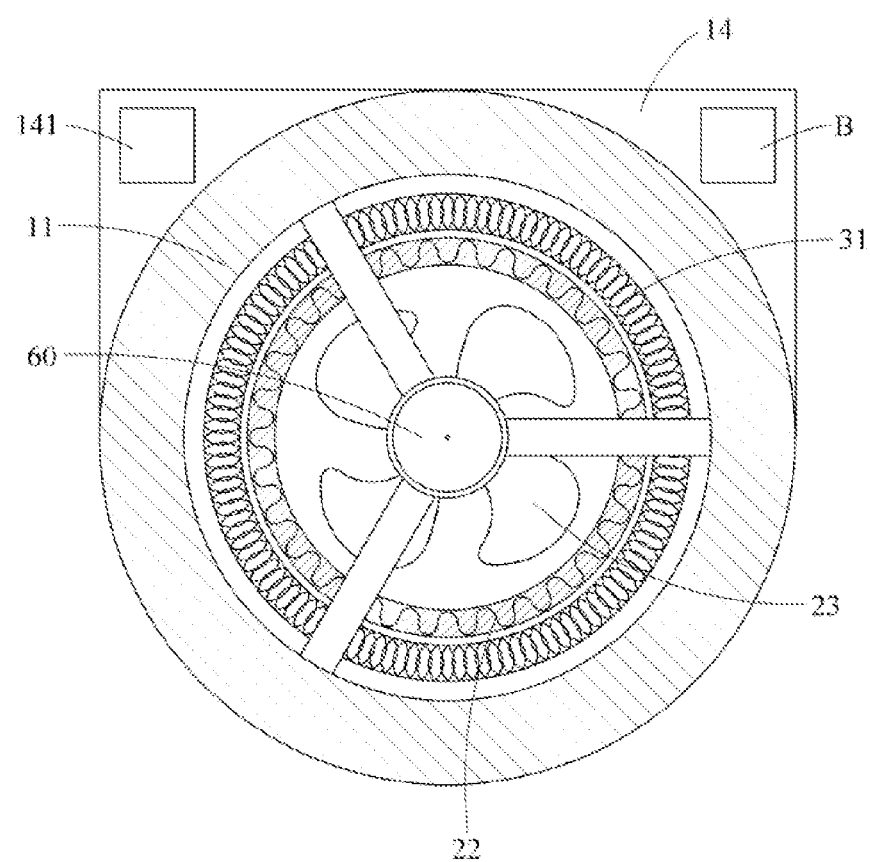
FIG. 2 is a front view showing the inside of the housing of a hybrid generator according to one embodiment of the present invention.
Figure 3:
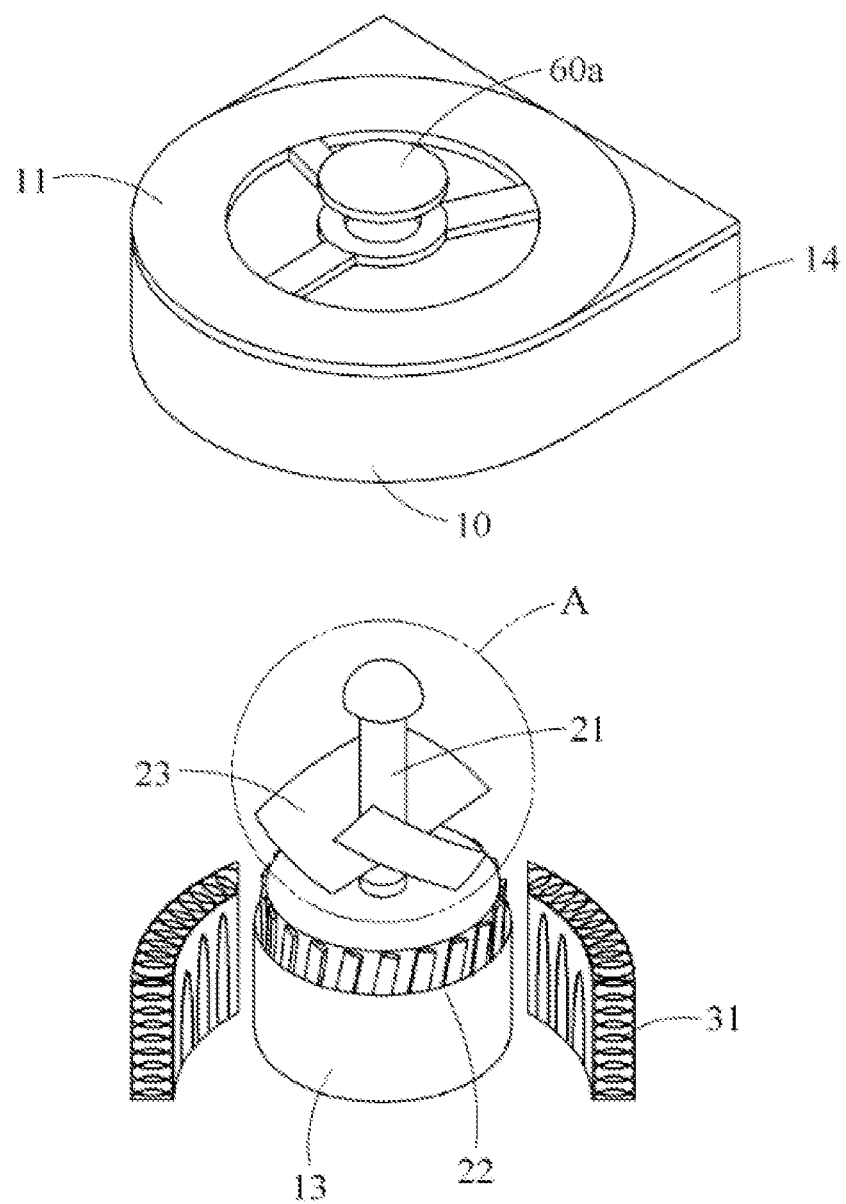
FIG. 3 is an exploded perspective view of a hybrid generator according to one embodiment of the present invention.
Figure 4A:
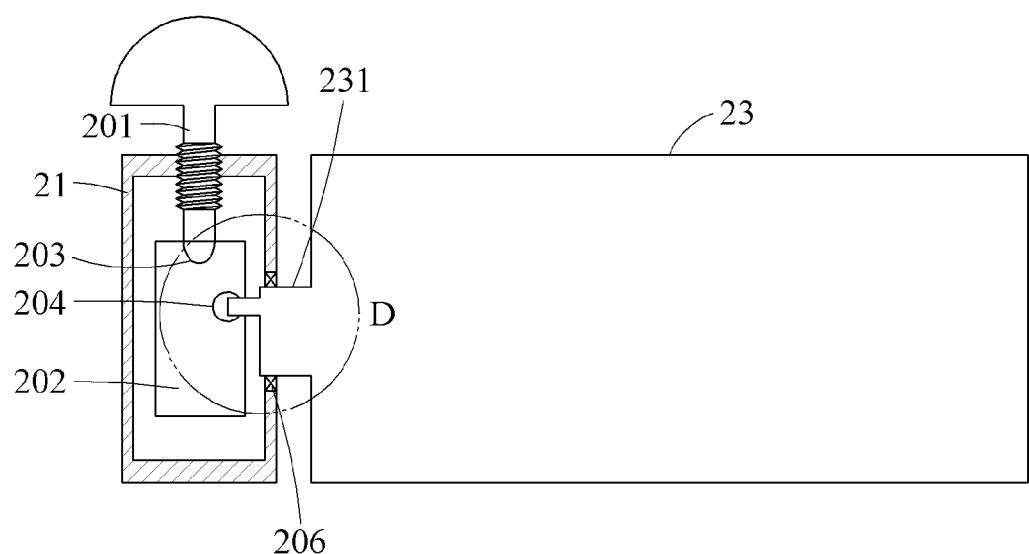
FIG. 4A is an internal cross-sectional view of part A shown in FIG. 3.
Figure 4B:
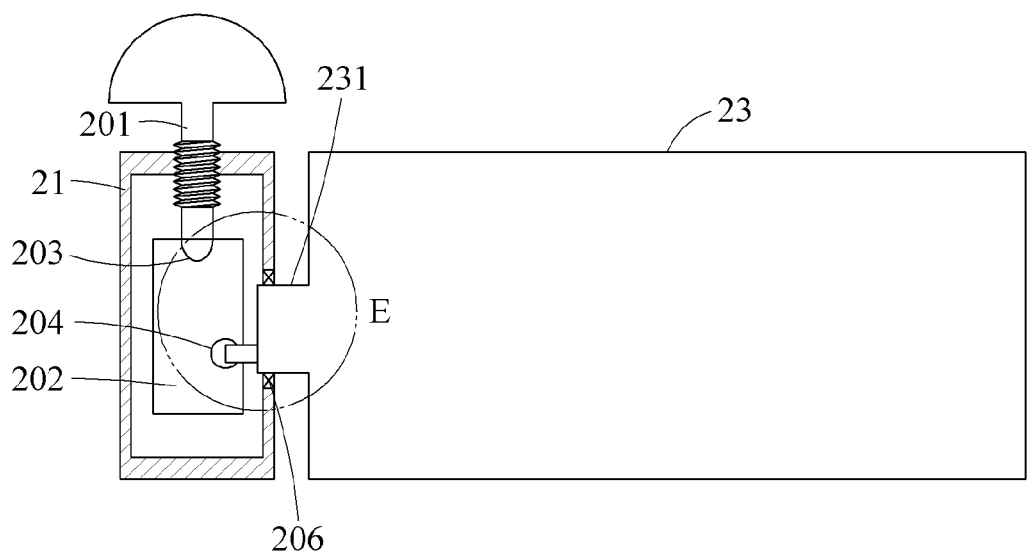
FIG. 4B is a cross-sectional view showing a state wherein the second ball joint shown in FIG. 4A is coupled to the lower side of a second rotary member.
Figure 5A:
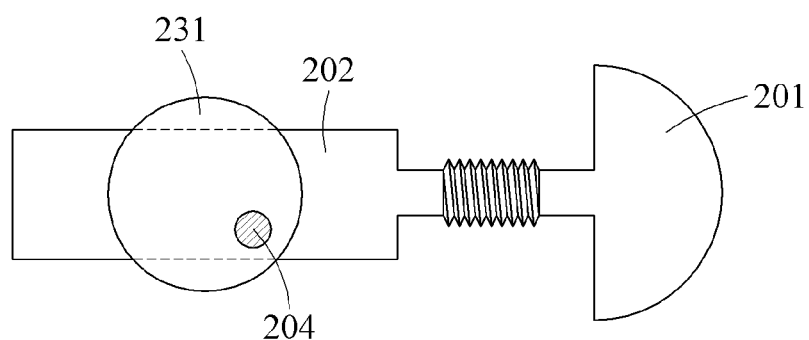
FIG. 5A is a side cross-sectional view of part D shown in FIG. 4A.
Figure 5B:
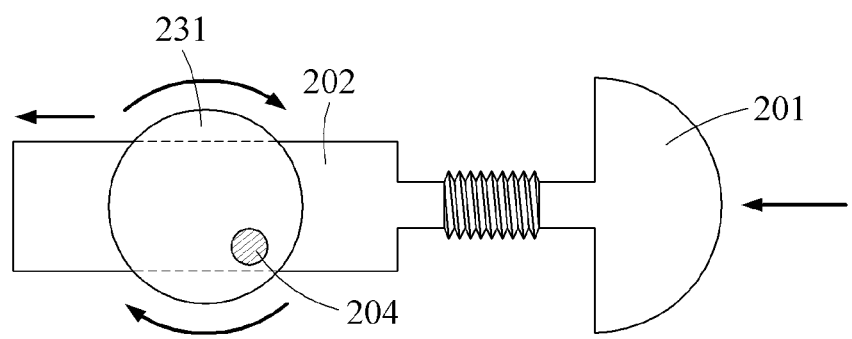
FIG. 5B is a cross-sectional view showing the direction of rotation of a first blade when a second rotary member is driven by driving the first rotary member shown in FIG. 5A.
Figure 6A:
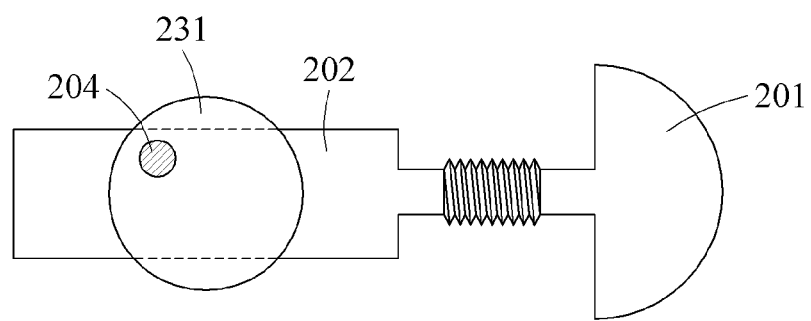
FIG. 6A is a side cross-sectional view of part E shown in FIG. 4B.
Figure 6B:
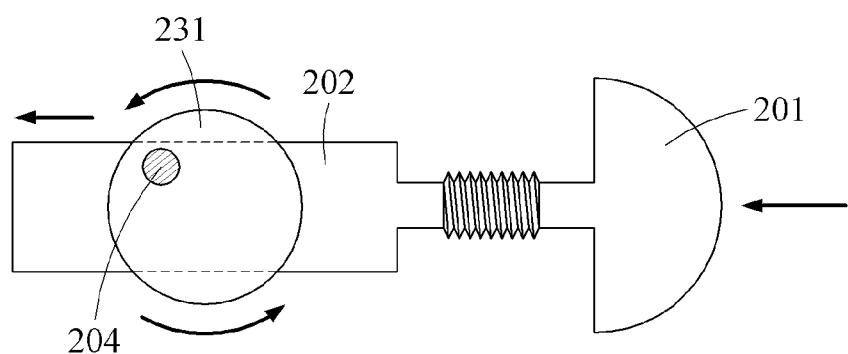
FIG. 6B is a cross-sectional view showing the direction of rotation of a first blade when a second rotary member is driven by driving the first rotary member shown in FIG. 6A.
Figure 7A:
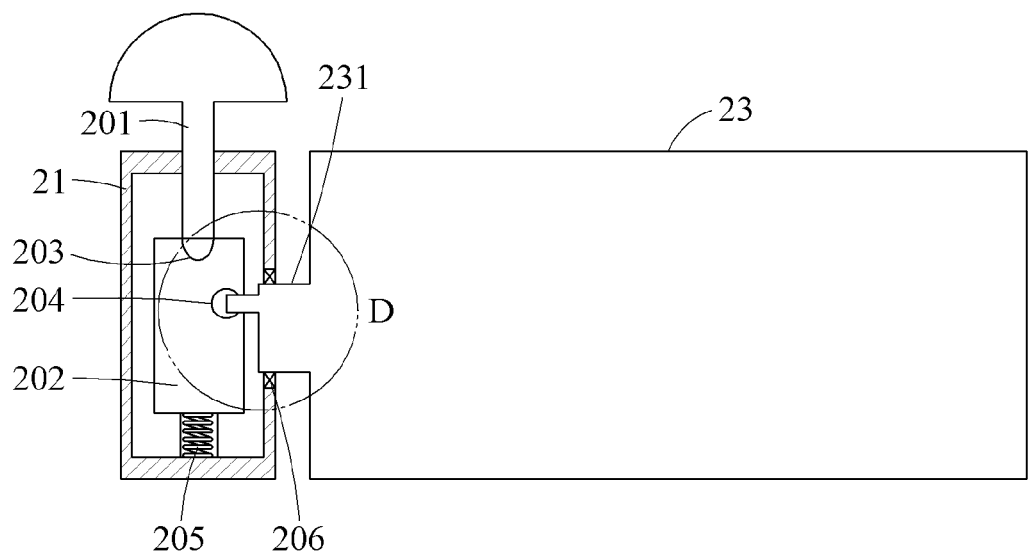
FIG. 7A is a cross-sectional view showing a state wherein the first rotary member shown in FIG. 4A is automatically moved by fluid pressure when one screw thread is formed on the outer circumferential surface of the first rotary member.
Figure 7B:
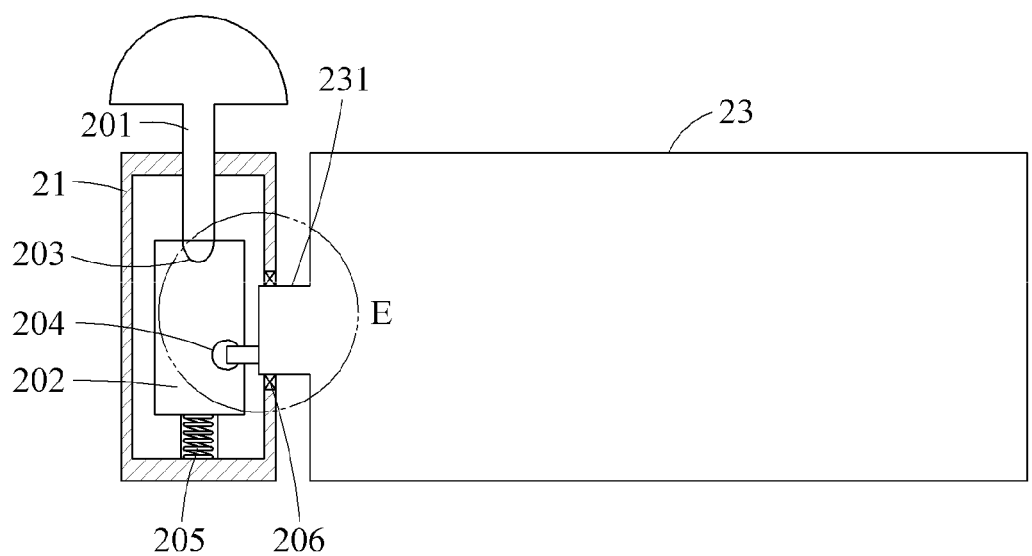
FIG. 7B is a cross-sectional view showing a state wherein the second ball joint shown in FIG. 7A is coupled to the lower side of a second rotary member.
Figure 8A:
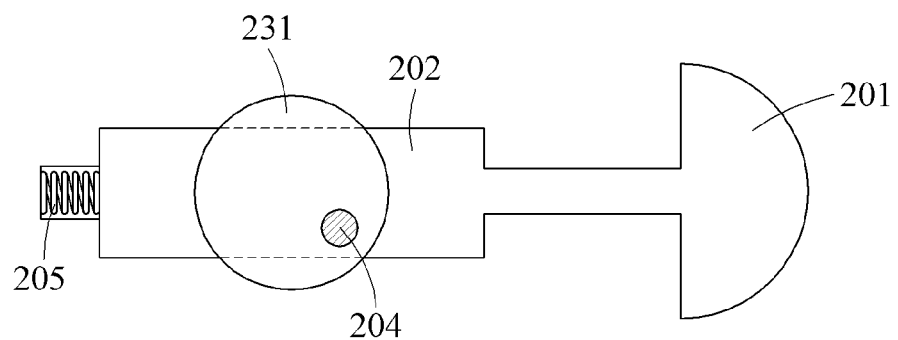
FIG. 8A is a side cross-sectional view of part D shown in FIG. 7A.
Figure 8B:
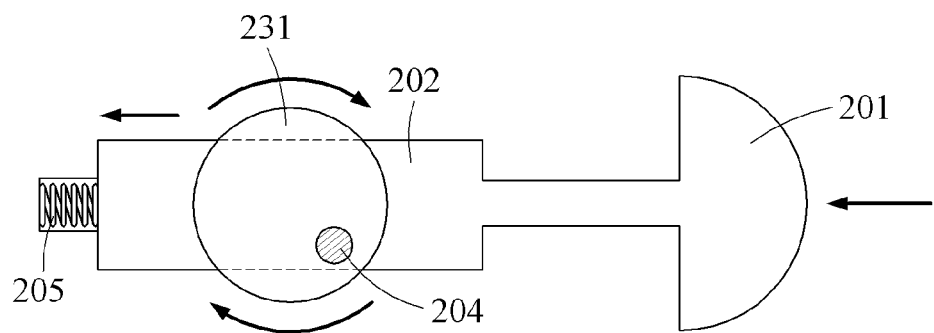
FIG. 8B is a cross-sectional view showing the direction of rotation of a first blade when a second rotary member is driven by driving the first rotary member shown in FIG. 8A.
Figure 9A:
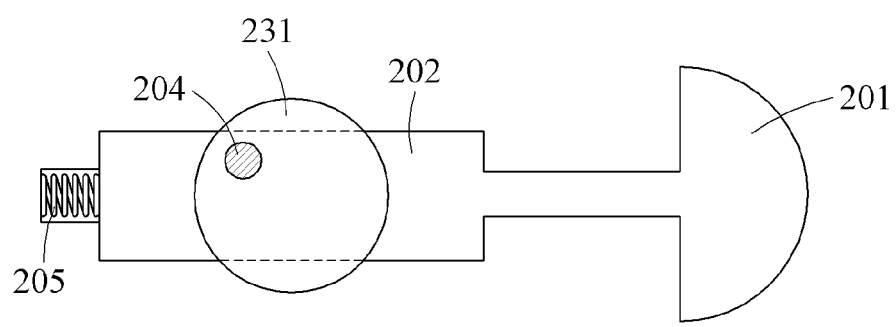
FIG. 9A is a side cross-sectional view of part E shown in FIG. 7B.
Figure 9B:
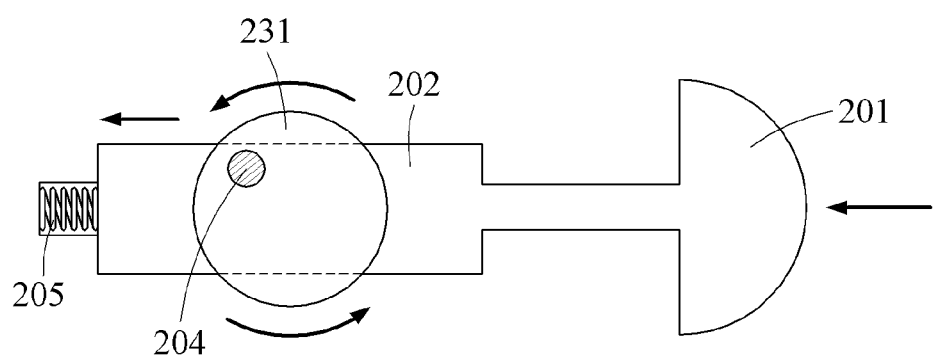
FIG. 9B is a cross-sectional view showing the direction of rotation of a first blade when a second rotary member is driven by driving the first rotary member shown in FIG. 9A.
Figure 10:
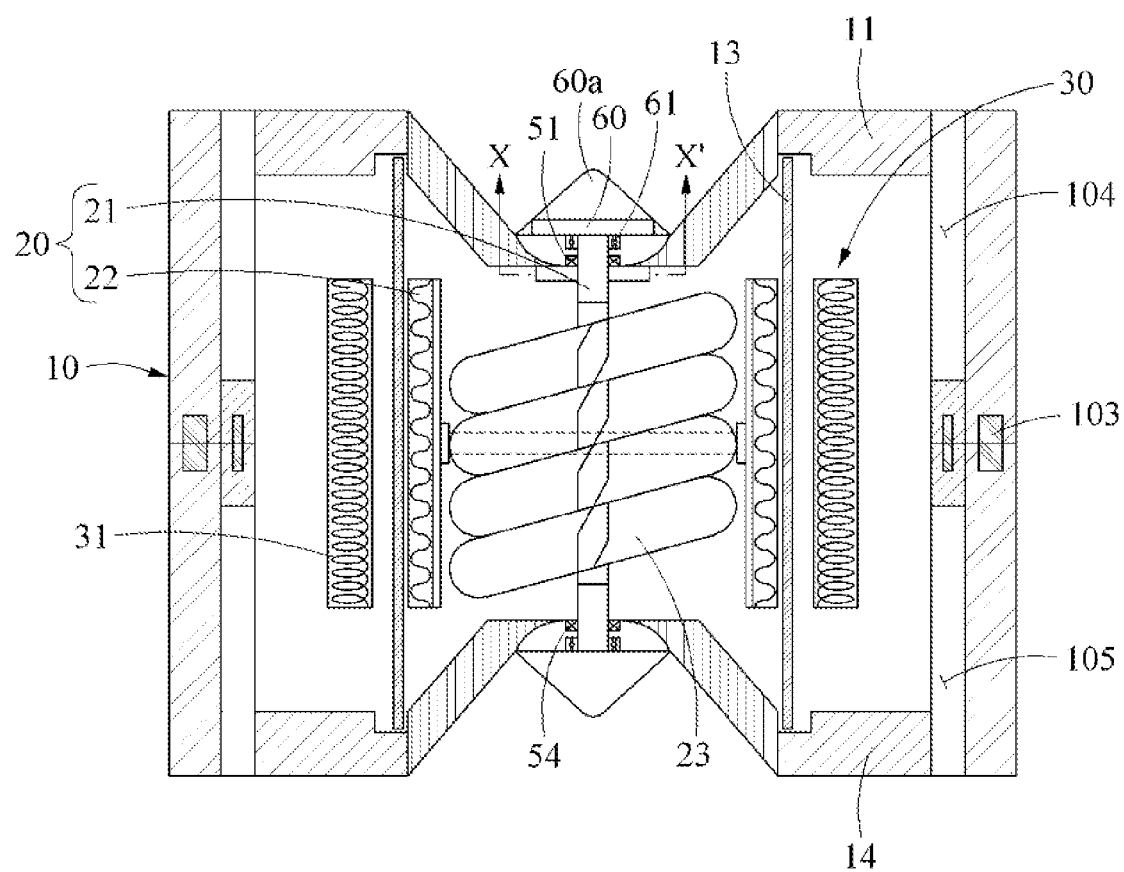
FIG. 10 is a longitudinal cross-sectional view of a hybrid generator according to one embodiment of the present invention.
Figure 11:
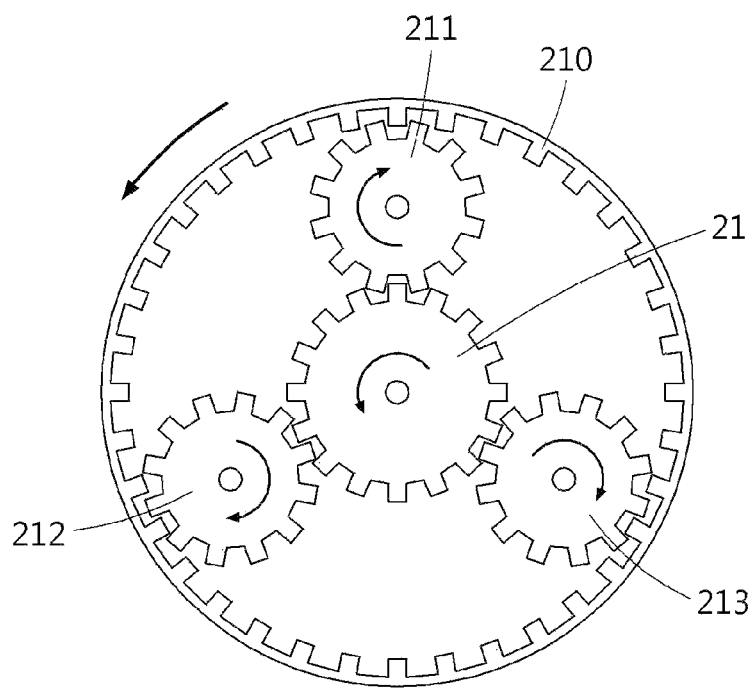
FIG. 11 is a cross-sectional view taken along line X-X' shown in FIG. 10.
Figure 12:
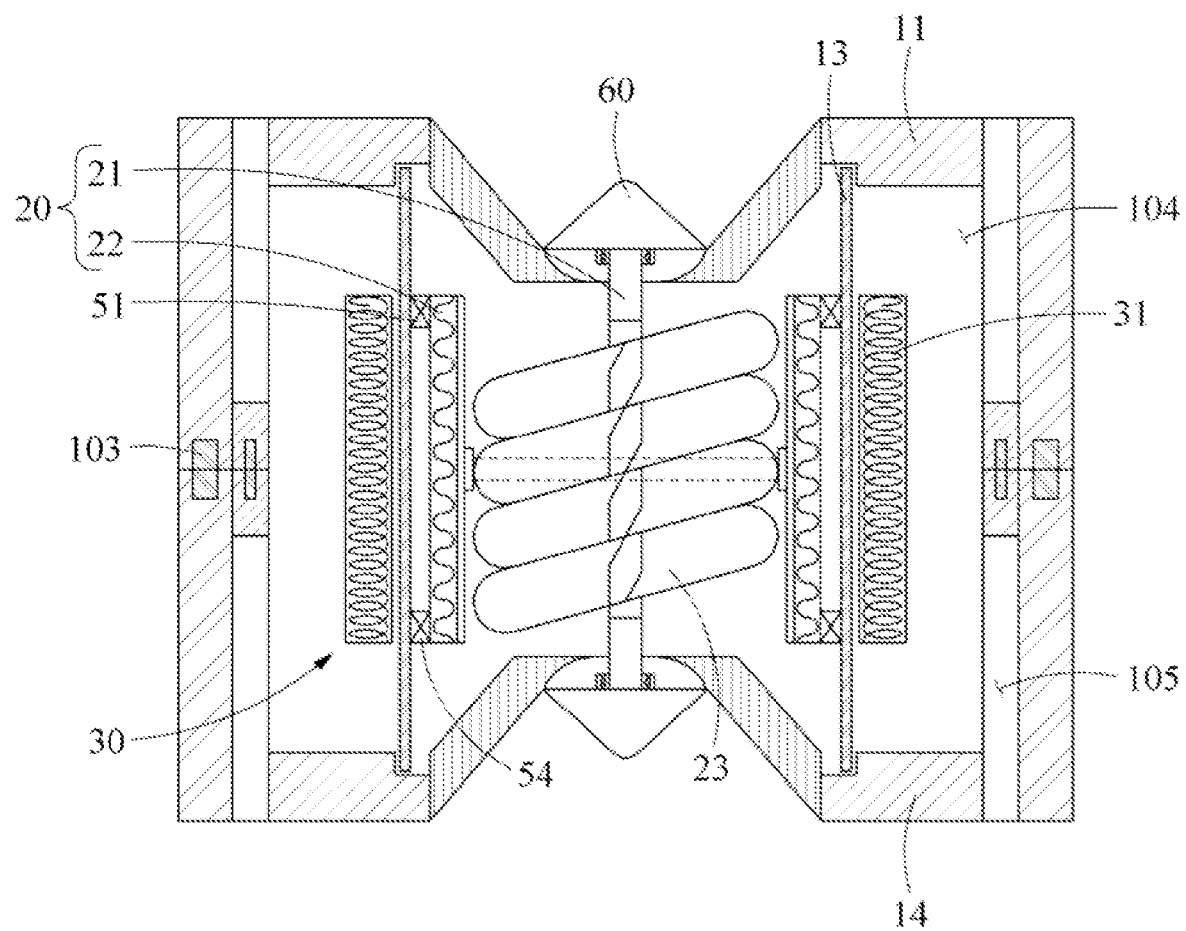
FIG. 12 is a cross-sectional view showing a state wherein a first rotating bearing is coupled between a rotor and a waterproof ring in a hybrid generator according to one embodiment of the present invention.

FIG. 1 is a front view of a hybrid generator according to one embodiment of the present invention, FIG. 2 is a front view showing the inside of the housing of a hybrid generator according to one embodiment of the present invention, FIG. 3 is an exploded perspective view of a hybrid generator according to one embodiment of the present invention, FIG. 4A is an internal cross-sectional view of part A shown in FIG. 3, FIG. 4B is a cross-sectional view showing a state wherein the second ball joint shown in FIG. 4A is coupled to the lower side of a second rotary member, FIG. 5A is a side cross-sectional view of part D shown in FIG. 4A, FIG. 5B is a cross-sectional view showing the direction of rotation of a first blade when a second rotary member is driven by driving the first rotary member shown in FIG. 5A, FIG. 6A is a side cross-sectional view of part E shown in FIG. 4B, FIG. 6B is a cross-sectional view showing the direction of rotation of a first blade when a second rotary member is driven by driving the first rotary member shown in FIG. 6A, FIG. 7A is a cross-sectional view showing a state wherein the first rotary member shown in FIG. 4A is automatically moved by fluid pressure when one screw thread is formed on the outer circumferential surface of the first rotary member, FIG. 7B is a cross-sectional view showing a state wherein the second ball joint shown in FIG. 7A is coupled to the lower side of a second rotary member, FIG. 8A is a side cross-sectional view of part D shown in FIG. 7A, FIG. 8B is a cross-sectional view showing the direction of rotation of a first blade when a second rotary member is driven by driving the first rotary member shown in FIG. 8A, FIG. 9A is a side cross-sectional view of part E shown in FIG. 7B, FIG. 9B is a cross-sectional view showing the direction of rotation of a first blade when a second rotary member is driven by driving the first rotary member shown in FIG. 9A, FIG. 10 is a longitudinal cross-sectional view of a hybrid generator according to one embodiment of the present invention, FIG. 11 is a cross-sectional view taken along line X-X' shown in FIG. 10, and FIG. 12 is a cross-sectional view showing a state wherein a first rotating bearing is coupled between a rotor and a waterproof ring in a hybrid generator according to one embodiment of the present invention.

Referring to FIGS. 1 to 12, a hybrid generator 1 according to one embodiment of the present invention may include a housing 10, a rotor 20, and a stator 30.

The hybrid generator 1 shown in FIGS. 1 to 12 may perform hydropower generation at any place, such as a river or at sea, where hydropower is present. In addition, the hybrid generator 1 may perform wind power generation and solar power generation in places where hydropower is absent. The hybrid generator 1 will be described in detail below.

The housing 10 may be formed in a cylindrical shape, and an empty space through which a fluid flows may be formed therein.

The rotor 20 and the stator 30 may be received inside the housing 10, and the rotor 20 may be rotatably installed inside the housing 10.

The rotor 20 may be received inside the housing 10, and may be rotated by a fluid flowing inside the housing 10.

The rotor 20 may include a rotating shaft 21 and a magnet 22 coupled to the rotating shaft 21. The rotating shaft 21 may be formed as a hollow shaft having an empty space therein or in a cylindrical shape with a solid inside, and a first blade 23 may be provided on the outer circumferential surface of the rotating shaft 21.

A hollow cylinder to which the magnet 22 is attached may be coupled to the periphery of the first blade 23, and the magnet 22 attached to the cylinder is not disposed in parallel with the rotating shaft 21 and a coil 31 but is disposed to be inclined at a predetermined angle with respect to the coil 31, as shown in FIG. 3.

As described above, since the magnet 22 is inclined, the cogging phenomenon does not occur with respect to the coil 31 provided in the stator 30, and rotation of the rotor 20 may be easily started. That is, when the magnet 22 is not disposed obliquely with respect to the coil 31 but is disposed in parallel with the coil 31, the magnetic force between the magnet 22 and the coil 31 facing the magnet 22 is strong when rotation of the rotor 20 is started. Accordingly, initial rotation of the rotor 20 may not be easy. On the other hand, when the magnet 22 is disposed obliquely with respect to the coil 31, the magnetic force between the magnet 22 and the coil 31 facing the magnet 22 is relatively weak when rotation of the rotor 20 is started. Accordingly, initial rotation of the rotor 20 may be easy.

The housing 10 may include an upper housing 11 coupled to one side of the rotating shaft 21 and a lower housing 12 coupled to the other side of the rotating shaft 21.

A first rotating bearing 51 may be provided between the upper housing 11 and the rotating shaft 21 to support rotation of the rotating shaft 21, and a second rotating bearing 54 may be provided between the lower housing 12 and the rotating shaft 21 to support rotation of the rotating shaft 21. In this case, a plurality of planetary gears 211, 212, and 213 may be coupled to the rotating shaft 21, and a ring gear 210 that transmits rotational driving force to the planetary gears 211, 212, and 213 may be further coupled to the rotating shaft 21 (see FIG. 9). The rotating shaft 21, the planetary gears 211, 212 and 213, and the ring gear 210 may be simultaneously driven to control the rotation speed of the rotating shaft 21.

Alternatively, the first and second rotating bearings 51 and 54 may be provided between the magnet 22 of the rotor 20 and a waterproof ring 13 (see FIG. 12). When the rotor 20 is rotated by flow of a fluid, the first and second rotating bearings 51 and 54 may support the rotation and reduce frictional resistance.

The upper and lower housings 11 and 12 may be detachably coupled, respectively. The upper housing 11 may have a first coupling groove 104 into which a coupling member (not shown) such as a bolt is inserted to couple the upper housing 11 with an external flange or the like, and the lower housing 12 may have a second coupling groove 105 into which a coupling member is inserted to couple the lower housing 12 with an external flange or the like.

An elastic sealing member 103 may be coupled between the upper and lower housings 11 and 12. For example, the sealing member 103 may be an O-ring made of a rubber material, and may prevent inflow of water into the gap between the upper and lower housings 11 and 12.

The upper and lower housings 11 and 12 may have a fitting groove (not shown) into which the sealing member 103 is fitted.

An auxiliary housing 14 may be coupled to one side of the outer circumferential surface of the housing 10. In this case, the auxiliary housing 14 may be provided with an inverter 141 and a battery B. The battery B may store induced current generated between the rotor 20 and the stator 30, and the inverter 141 may convert the stored current into alternating current.

For example, when a hollow space is formed inside the rotating shaft 21 (see FIG. 4), one side of the first blade 23 may be inserted into and coupled to the rotating shaft 21, and the angle of the first blade 23 may be adjusted.

More specifically, the first blade 23 may be rotatably coupled to the rotating shaft 21. In this case, a first rotary member 201, which is movable in the vertical direction by the pressure of a fluid flowing into the housing 10, may be coupled to the rotating shaft 21. A portion of the outer circumferential surface of the first rotary member 201 may be formed in a screw thread shape and coupled to the rotating shaft 21, and the upper end of the first rotary member 201 may be formed in a concave shape to receive the pressure of a fluid.

In addition, a second rotary member 202 having one side engageable with the first rotary member 201 and the other side engageable with the first blade 23 may be provided inside the rotating shaft 21. In this case, a first ball joint 203 may be provided at a portion connecting the first and second rotary members 201 and 202. When the upper end of the first rotary member 201 is moved downward by the pressure of a fluid introduced into the housing 10, the first and second rotary members 201 and 202 may be rotated at a predetermined angle.

That is, the first ball joint 203 may adjust a rotation angle between the first and second rotary members 201 and 202 when the first rotary member 201 is moved downward in the rotating shaft 21 by the pressure of a fluid.

In addition, a second ball joint 204 may be provided at a portion connecting the second rotary member 202 and the first blade 23. For example, as shown in FIGS. 4A and 5, the second ball joint 204 may be engaged at the lower side of the first blade 23 with respect to the center of the cross section of a blade rotating shaft 231. That is, the second ball joint 204 may be engaged at a position eccentrically downward from the center of the cross section of the blade rotating shaft 231.

When the first rotary member 201 moves downward inside the rotating shaft 21 (see FIG. 5B), the blade rotating shaft 231 may be rotated clockwise, and the second rotary member 202 may be moved vertically downward. In this case, as the blade rotating shaft 231 is rotated clockwise, the first blade 23 is also rotated clockwise, so that the angle of inclination of the first blade 23 may be increased. Accordingly, the amount of a fluid flowing into the housing 10 and in contact with the end face of the first blade 23 may increase, and fluid pressure applied to the first blade 23 may also increase. That is, when the position where the second ball joint 204 is engaged with the blade rotating shaft 231 is eccentric in the downward direction with respect to the center of the cross section of the blade rotating shaft 231, the rotational angle of the first blade 23 is increased, the area of contact between the first blade 23 and the fluid becomes larger, and pressure applied to the first blade 23 is also increased, so that the amount of electric energy generated may be increased.

In contrast, as shown in FIGS. 4B and 6, the second ball joint 204 may be engaged at the upper side of the first blade 23 with respect to the center of the cross section of the blade rotating shaft 231. That is, the second ball joint 204 may be engaged at a position eccentrically upward from the center of the cross section of the blade rotating shaft 231.

When the first rotary member 201 moves downward inside the rotating shaft 21 (see FIG. 6B), the blade rotating shaft 231 may be rotated counterclockwise, and the second rotary member 202 may be moved vertically downward. In this case, as the blade rotating shaft 231 is rotated counterclockwise, the first blade 23 may be also rotated counterclockwise, the angle of inclination of the first blade 23 may be decreased, the amount of a fluid flowing into the housing 10 and in contact with the first blade 23 may decreased, and the fluid flowing into the housing 10 may be discharged to the outside of the housing 10.

In addition, as shown in FIGS. 7A and 7B, no screw thread may be formed on the outer circumferential surface of the first rotary member 201 coupled to the rotating shaft 21. Referring to FIGS. 4 to 6, a screw thread is formed on the outer circumferential surface of the first rotary member 201, and the angle of the first blade 23 may be adjusted by manually moving the first rotary member 201 in the vertical direction. Even when no screw thread is formed, the first rotary member 201 may be automatically moved to the inside or outside of the rotating shaft 21 by the pressure of a fluid flowing into the housing 10.

That is, when a screw thread is formed on the outer circumferential surface of the first rotary member 201, the second rotary member 202 may be manually moved in the vertical direction. Accordingly, a spring 205 need not be provided (see FIGS. 4 to 6). When no screw thread is formed on the outer circumferential surface of the first rotary member 201, the spring 205 may be provided between the second rotary member 202 and the inner circumferential surface of the rotating shaft 21, so the second rotary member 202 may be automatically moved to the inside or outside of the rotating shaft 21 by the pressure of a fluid flowing into the housing 10.

In the case of hydroelectric power generation using the first blade 23, depending on the amount of water flowing into the housing 10, the rate of rotation of the first blade 23 and pressure applied to the first blade 23 may be changed. The first blade 23 may be rotated at a predetermined angle depending on flow of a fluid flowing into the housing 10, and the amount of electric energy generated may also vary depending on change in the area of the first blade 23 contacting a fluid.

More specifically, the rotation angle of the first blade 23 when the amount of water flowing into the housing 10 is larger than the rotation angle of the first blade 23 when the amount of water flowing into the housing 10 is small. Accordingly, the area of the first blade 23 contacting a fluid may be wider, and pressure applied to the first blade 23 may also be increased.

The stator 30 may be coupled between the housing 10 and the rotor 20, and may formed so as to surround the periphery of the rotor 20. In addition, at least one coil 31 may be provided in the stator 30.

When a fluid flows into the housing 10 and the rotating shaft 21 is rotated, the magnet 22 rotated integrally with the rotating shaft 21 may be rotated. Therefore, when the rotor 20 is rotated, a magnetic field due to rotation of the magnet 22 may be generated in the stator 30, and induced current caused by induced electromotive force by the coil 31 may flow. The waterproof ring 13 may be provided between the rotor 20 and the stator 30. More specifically, the waterproof ring 13 may prevent a fluid from flowing into the coil 31 of the stator 30. For example, the waterproof ring 13 may be formed of a non-conductive material such as plastic or a non-magnetic metal material.

A coupling member 60 to which a second blade 71 described below is coupled may be provided at one end or the other end of the rotating shaft 21. For example, the coupling member 60 may be formed in a conical shape having a sharp point toward one end. The coupling member 60 is formed to be inclined toward one end, thereby increasing flow of a fluid and suppressing generation of an eddy.

However, when the second blade 71 is coupled to the hybrid generator 1, an upper portion of the coupling member 60 may be formed to be detachable. In the case of hydroelectric power generation, a tip portion 60*a* may be engaged with the coupling member 60 to increase flow of a fluid. In the case of wind power generation, the tip portion 60*a* may be separated from the coupling member 60 and the second blade 71 may be engaged.

A sealing portion 61 may be provided between the rotating shaft 21 and the coupling member 60 to receive at least a portion of the rotating shaft 21 and prevent the rotating shaft 21 from being separated from the coupling member 60. In this case, the sealing portion 61 may be an O-ring, and may be formed of an elastic material. Thus, when pressure is applied to the rotating shaft 21, the sealing portion 61 is elastically deformed to block a gap and prevent inflow of a fluid. In addition, a fitting groove (not shown) to which the sealing portion 61 is fitted may be formed in the inner side of the coupling member 60.

Figure 13:
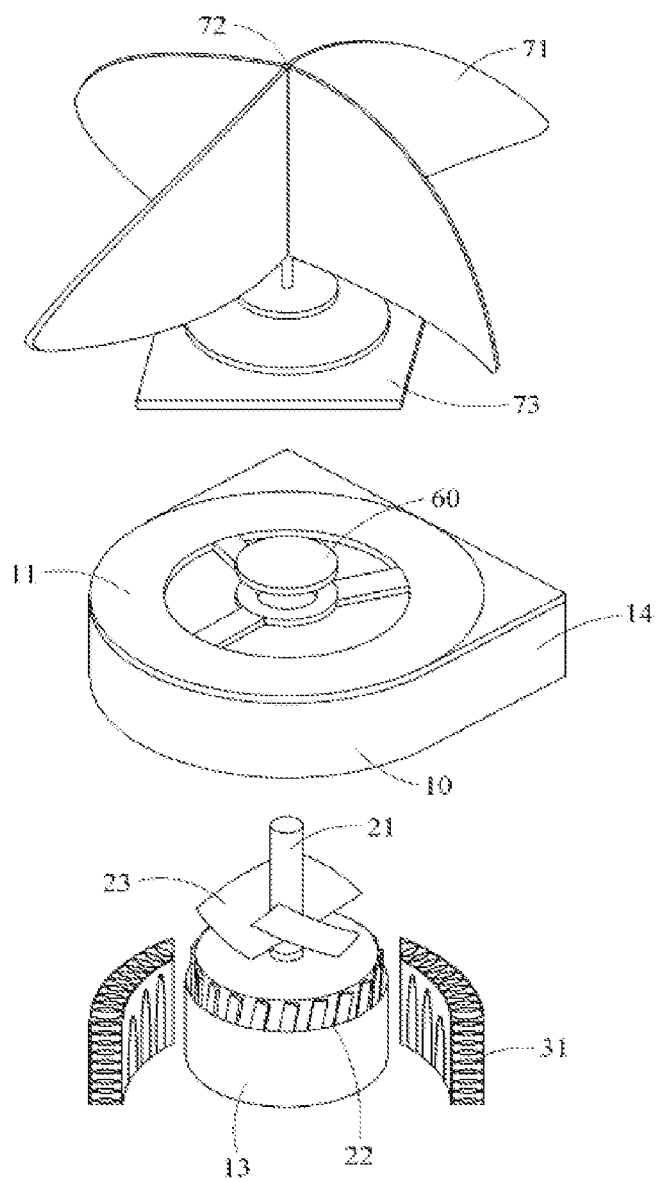
FIG. 13 is an exploded perspective view of a hybrid generator according to one embodiment of the present invention to which a wind power rotator is coupled.
Figure 14:
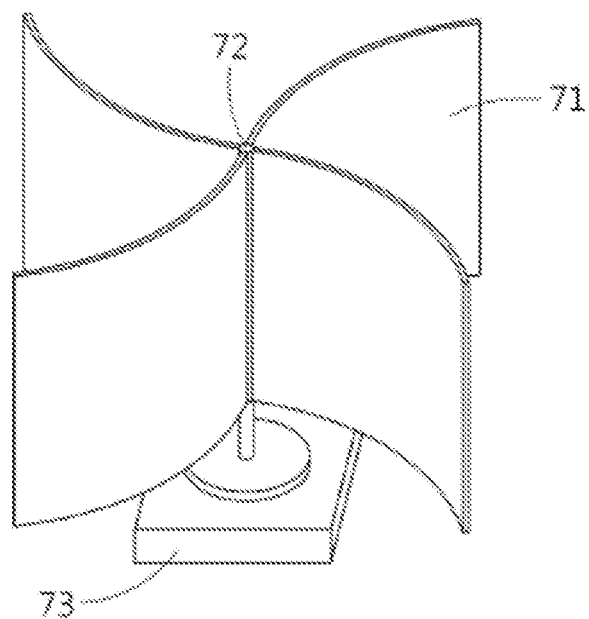
FIG. 14 illustrates another type of wind power rotator coupled to a hybrid generator according to one embodiment of the present invention.

FIG. 13 is an exploded perspective view of a hybrid generator according to one embodiment of the present invention to which a wind power rotator is coupled, and FIG. 14 illustrates another type of wind power rotator coupled to a hybrid generator according to one embodiment of the present invention.

Referring to FIGS. 13 and 14, the hybrid generator 1 according to one embodiment of the present invention may include the housing 10, the rotor 20, the upper and lower housings 11 and 12, the auxiliary housing 14, the stator 30, and a wind power rotator.

The wind power rotator may be provided on the outer side of the housing 10 and may be detachably coupled to one side or the other side of the rotating shaft 21. In addition, the wind power rotator may be provided with a rotating shaft 72 having the second blade 71 on the outer circumferential surface thereof, and may be rotated by a fluid, i.e., wind, flowing outside the housing 10.

A rotating coupler 73 detachably coupled to the coupling member 60 may be provided at a lower portion of the wind power rotator.

For example, the first and second blades 23 and 71 may be formed in a fan wing shape, a spiral shape, or a plate shape on which a curved surface is formed. In addition, the first and second blades 23 and 71 may be formed of a flexible material so that the first and second blades 23 and 71 may be easily folded and spread like an umbrella.

In particular, the second blade 71 is preferably formed in a shape that minimizes damage or deformation of the second blade 71 due to pressure of a flowing fluid. Therefore, when the second blade 71 is formed in a plate shape, a curved surface may be formed on a part of the plate so as to efficiently receive flow of a fluid.

Figure 15:
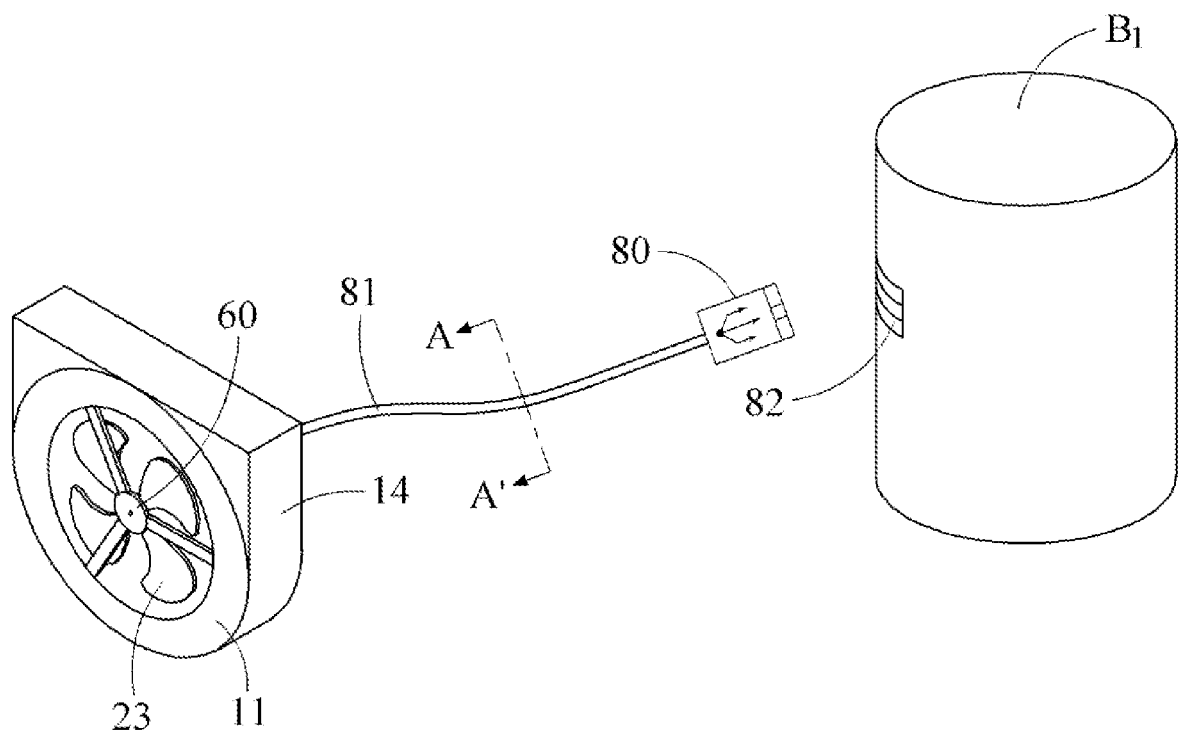
FIG. 15 illustrates the charging terminal of a hybrid generator according to one embodiment of the present invention.
Figure 16:
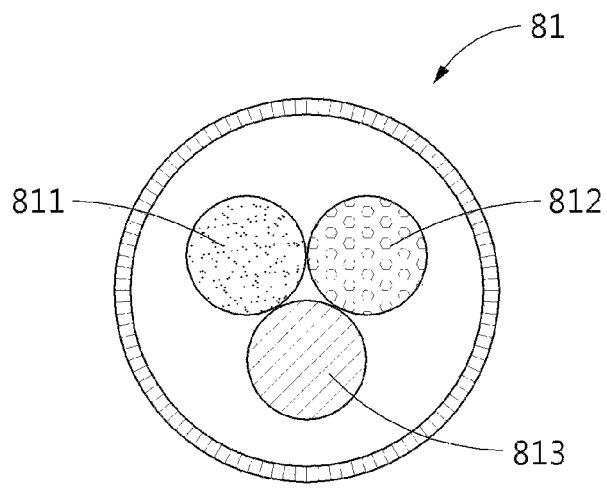
FIG. 16 is a cross-sectional view taken along line A-A' line shown in FIG. 15.

FIG. 15 illustrates the charging terminal of a hybrid generator according to one embodiment of the present invention, and FIG. 16 is an internal cross-sectional view of the charging terminal of a hybrid generator according to one embodiment of the present invention.

Referring to FIGS. 15 and 16, in the hybrid generator 1 according to one embodiment of the present invention, a charging terminal 80 extending outside the housing 10 may be further provided on one side of the housing 10.

For example, the charging terminal 80 may be provided as a USB port. The hybrid generator 1 may be connected to an auxiliary battery $B_1$ or an energy storage system E via the USB port, and energy generated in the hybrid generator 1 may be stored in the auxiliary battery $B_1$ or the energy storage system E.

The auxiliary battery $B_1$ may be provided with a charging terminal groove 82 to which the charging terminal 80 may be coupled. For example, the auxiliary battery $B_1$ may be used in a smartphone, a camera, a navigation system, an automobile, and the like. That is, electric energy may be generated from natural energy such as hydropower and wind power using the hybrid generator 1, and the generated electric energy may be transferred to the auxiliary battery $B_1$ via the charging terminal 80 and stored in the auxiliary battery $B_1$. When necessary, the auxiliary battery $B_1$ may be used depending on the application.

In this case, the charging terminal 80 may be provided with two electrode wires 811 and 812 and an elastic wire 813. Among the electrode wires 811 and 812, at least one may be a positive electrode wire 811 and the other may be a negative electrode wire 812 so that current may flow through the electrode wires 811 and 812. In addition, the elastic wire 813 made of an elastic material may be used so as to prevent disconnection of the electrode wires 811 and 812. For example, as the elastic wire 813, fishing line or piano wire which is transparent and has a high carbon steel content may be used. In this case, the fishing line or piano wire may have excellent elasticity and thus may be used for a long period of time.

Figure 17:
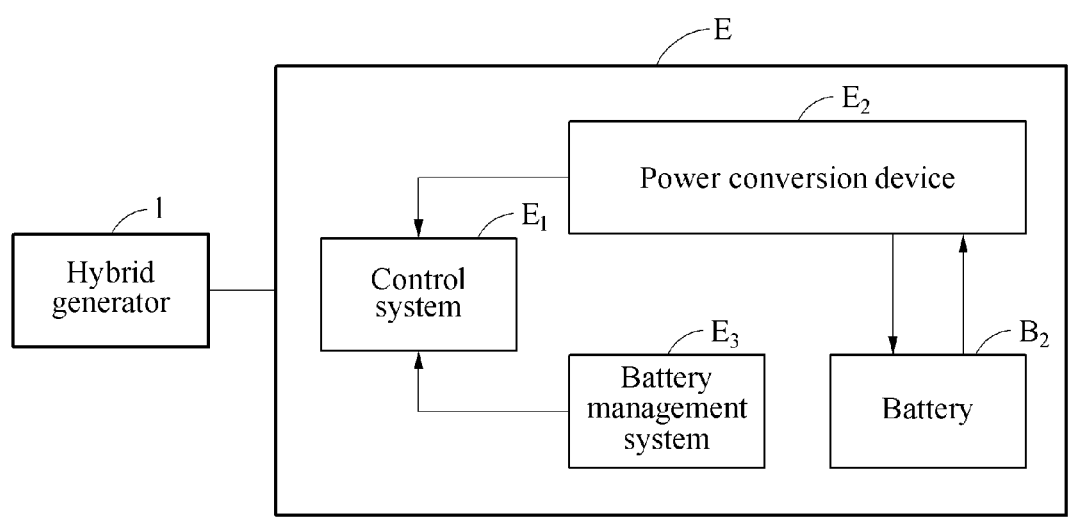
FIG. 17 is a block diagram schematically showing the energy storage system (ESS) of a hybrid generator according to one embodiment of the present invention.

FIG. 17 is a block diagram schematically showing the energy storage system (ESS) of a hybrid generator according to one embodiment of the present invention.

The energy storage system E may control various voltages/current generated from renewable energy such as wind power or hydropower as in the present invention. The energy storage system E may be connected to a power system as needed, or may store and use idle energy. In the present invention, the energy storage system E may be connected to the hybrid generator 1 to store electric energy generated.

The energy storage system E may efficiently utilize electric energy generated, improve the quality of the generated electric energy, and minimize damage in case of power failure.

The energy storage system E includes a battery $B_2$, a control system $E_1$, a power conversion device $E_2$, and a battery management system $E_3$.

The battery $B_2$ may be composed of positive and negative electrodes, an electrolyte, a separator, and the like, and may store electric energy in the energy storage system E. The battery $B_2$ may be configured to store power converted into a predetermined form through the power conversion device $E_2$ and to discharge the stored power when necessary.

In addition, the control system $E_1$ may monitor the state of the battery $B_2$. More specifically, the control system $E_1$ may monitor and control the state of the power conversion device $E_2$, and may be used as an operating system for monitoring and controlling the energy storage system E in a control center (not shown).

In addition, the characteristics of power at the time of storage and the characteristics of the power at the time of use are different, and the power conversion device $E_2$ may compensate for the difference. More specifically, the power conversion device $E_2$ may receive electric energy generated by the hybrid generator 1 and store the electric energy in the battery $B_2$, or may convert the characteristics of the electric energy (AC/DC, voltage, frequency) to release the electric energy to a power system (not shown).

In addition, the battery management system $E_3$ may notify the state of charge of the battery $B_2$ and perform a protection function against overcharge/overdischarge.

Therefore, it is possible to improve the quality of intermittent renewable energy sources, thereby stabilizing the supply and demand of electric power, and to reduce the investment cost of power plant facilities.

Figure 18:
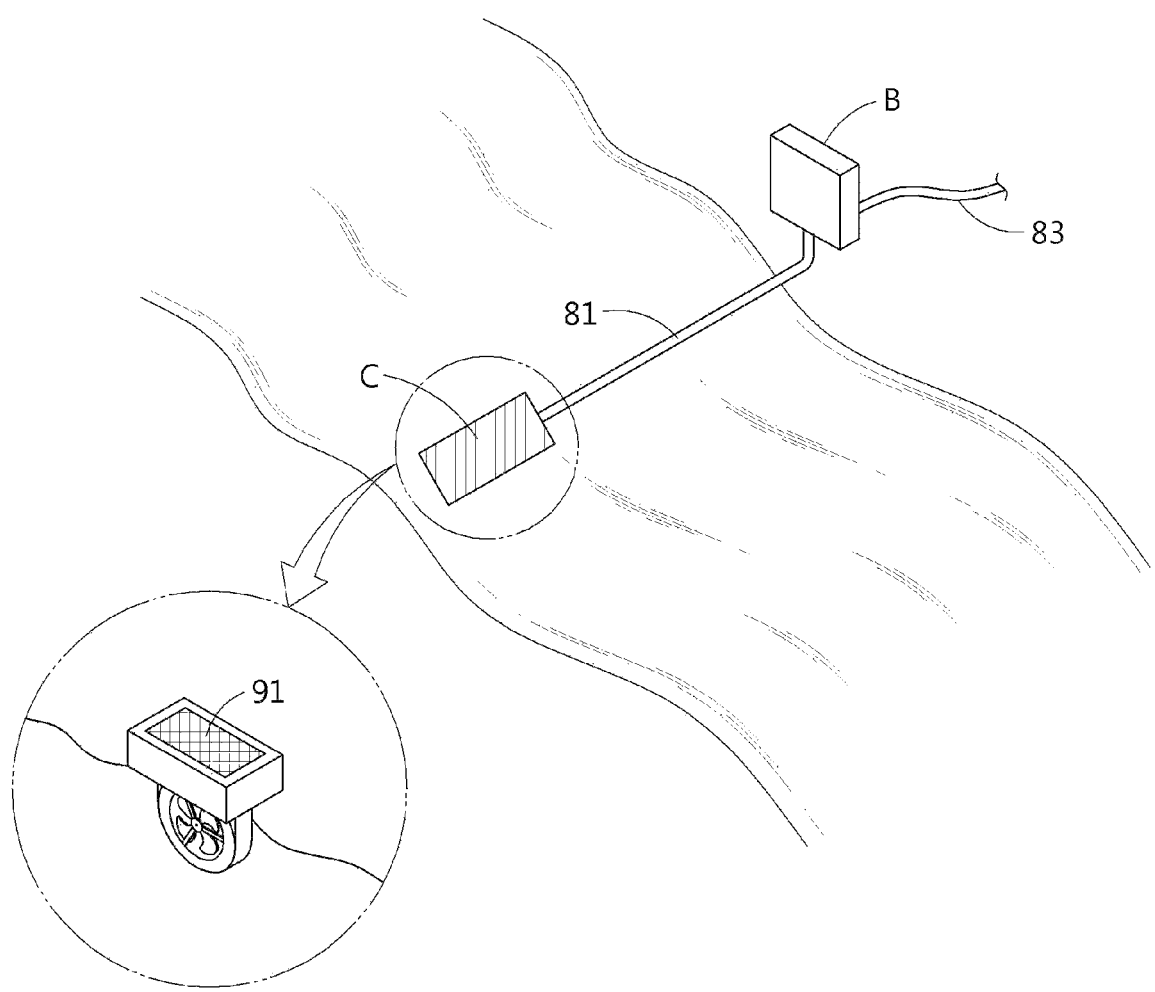
FIG. 18 is a drawing schematically showing a state wherein a hybrid generator according to one embodiment of the present invention generates electric energy using hydropower.
Figure 19:
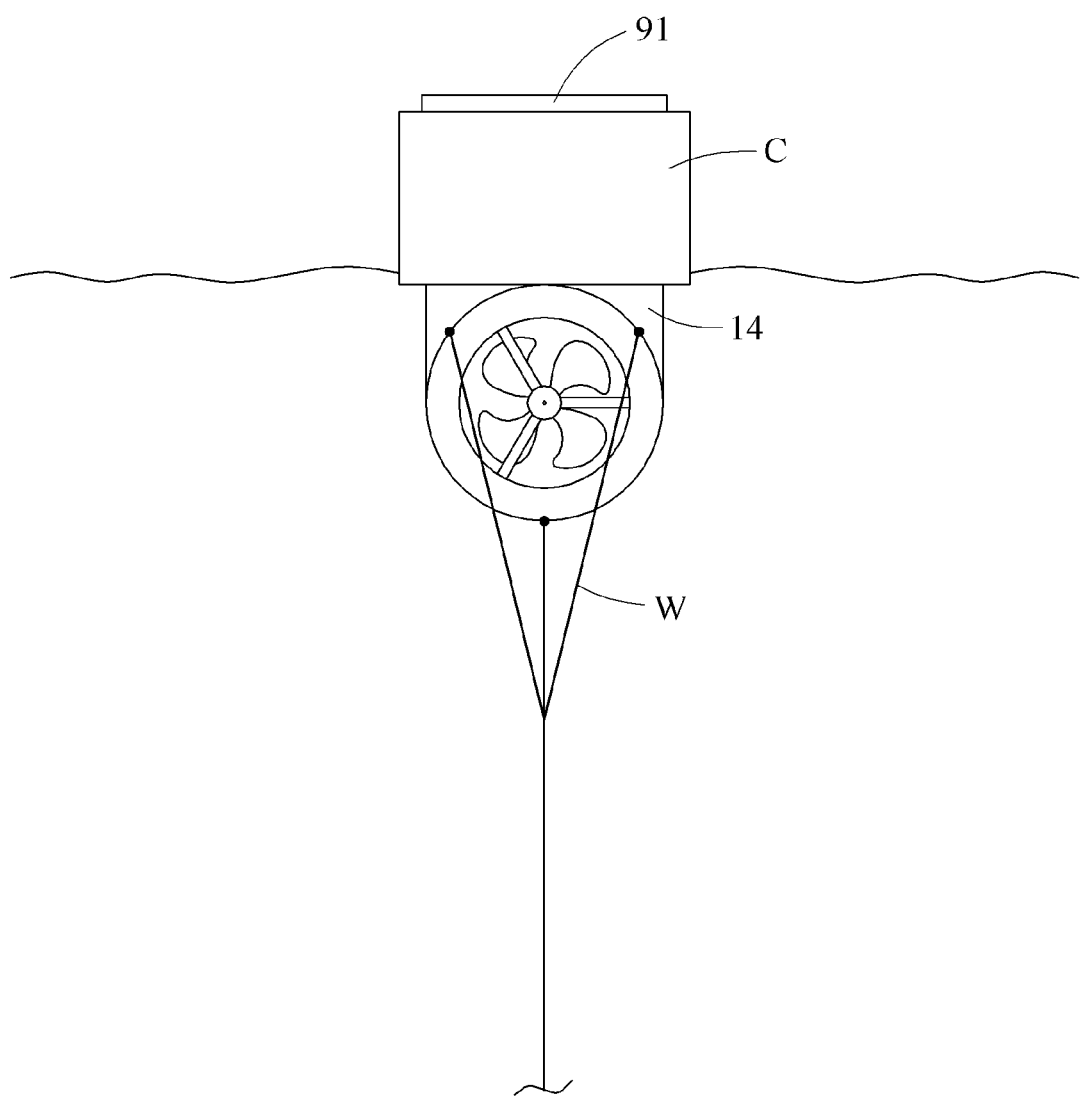
FIG. 19 is a drawing schematically showing a state wherein a hybrid generator according to one embodiment of the present invention coupled to the lower side of a case generates electric energy using hydropower.

FIG. 18 is a drawing schematically showing a state wherein a hybrid generator according to one embodiment of the present invention generates electric energy using hydropower, and FIG. 19 is a drawing schematically showing a state wherein a hybrid generator according to one embodiment of the present invention coupled to the lower side of a case generates electric energy using hydropower.

Referring to FIGS. 18 and 19, the hybrid generator 1 according to the present invention may be used to generate electric energy using hydropower.

The hybrid generator 1 according to one embodiment of the present invention may be received in a case C. The case C may be provided with a buoyant member (not shown) that imparts buoyancy to the case C so that the case C floats on water. In addition, the case C may be provided with a case solar cell 91 that performs solar energy generation while floating on water. In addition, the case C itself may be used as a buoyant member. In this case, even when the case C does not have a separate buoyant member, the case C may be floated on water.

The hybrid generator 1 may be installed in areas where hydropower is present. In this case, the first blade 23 provided on the rotor 20 is rotated by flow of water, and this rotational force may be converted into electric energy.

When the hybrid generator 1 generates electric energy using hydropower, the generated electric energy may be stored in the battery B via an electric wire 81 extending outside the housing 10. The battery B may supply the stored electric energy to an external device via a connection wire 83 connected to the external device.

In particular, when using the hybrid generator 1 for hydroelectric power generation, the housing 10 may be closely fixed to the lower portion of the case C. In this case, a plurality of wires W may be provided on the housing 10 so that the housing 10 and the case C are not swept away by water during hydroelectric power generation. In this case, the housing 10 may be fixed by hanging the wires W on a stone in water or a pile.

Hereinafter, operation of the hybrid generator 1 according to one embodiment of the present invention will be described.

First, the hybrid generator 1 may be used to generate electric energy by hydroelectric power generation in an area where water is present, such as a river or sea.

When water flows into the housing 10 of the hybrid generator 1, the rotor 20 in the housing 10 may be rotated by hydropower. In this case, the rotor 20 may be provided with the first blade 23 so that the rotor 20 may be rotated by flow of water. For example, when the amount of water flowing into the housing 10 is greater than the reference amount, hydropower applied to the first blade 23 may be increased and thus the amount of generated electric energy may be increased. On the other hand, when the amount of water flowing into the housing 10 is less than the reference amount, hydropower applied to the first blade 23 may be decreased and thus the amount of generated electric energy may be decreased.

When the first blade 23 is rotated in one direction by water pressure, the magnet 22 coupled to the rotating shaft 21 may be integrally rotated, so that induced current due to an induced electromotive force may be generated in the coil 31 provided in the stator 30.

Therefore, the generated current may be transmitted through the electric wire 81 extending outside the housing 10, and may be stored in the auxiliary battery $B_1$ or the energy storage system E through the charging terminal 80 provided on the end portion of the electric wire 81.

In addition, the hybrid generator 1 may be installed in a windy area and may generate electric energy by performing wind power generation.

When the hybrid generator 1 is used to generate electric energy through wind power generation, the wind power rotator 70 may be further coupled to the hybrid generator 1.

The wind power rotator 70 may be coupled to the upper portion of the upper housing 11 of the housing 10, and may be rotated by wind blowing outside the housing 10 to generate electric energy. Therefore, in addition to the case wherein the wind power rotator 70 is rotated by wind blowing outside the housing 10 to generate electric energy, the first blade 23 may be rotated while wind introduced through the lower portion of the rotor 20 is discharged through the upper portion, and subsequently, the magnet 22 coupled to the rotating shaft 21 may be integrally rotated so that induced current due to an induced electromotive force may be generated in the coil 31 provided in the stator 30.

Therefore, the generated current may be transmitted through the electric wire 81 extending outside the housing 10, and may be stored in the auxiliary battery $B_1$ or the energy storage system E through the charging terminal 80 provided on one end of the electric wire 81.

[Description of Symbols]

| | |
|---|---|
| 1: HYBRID GENERATOR | 10: HOUSING |
| 11: UPPER HOUSING | 12: LOWER HOUSING |
| 13: WATERPROOF RING | 16: ROTATING BEARING |
| 20: ROTOR | 21: FIRST ROTATING SHAFT |
| 22: MAGNET | 23: FIRST BLADE |
| 30: STATOR | 31: COIL |
| 51: FIRST ROTATING BEARING | 53: MOISTURE FILTER |
| 54: SECOND ROTATING BEARING | 60: COUPLING MEMBER |
| 61: SEALING PORTION | |
| 71: SECOND BLADE | 72: SECOND ROTATING SHAFT |
| 73: ROTATING COUPLER | 80: CHARGING TERMINAL |
| 81: ELECTRIC WIRE | 82: CHARGING TERMINAL |
| GROOVE | |
| 83: CONNECTION WIRE | 90: SOLAR CELL |
| 104, 105: COUPLING GROOVE | 201, 202: ROTARY MEMBER |
| 203, 204: BALL JOINT | 205: SPRING |
| 206: SUPPORT BEARING | B: BATTERY |
| E: ENERGY STORAGE SYSTEM | |

The invention claimed is:

1. A hybrid generator, comprising:
a housing having an empty space through which a fluid flows;
a rotor received inside the housing, rotated by the fluid flowing inside the housing, and having a magnet; and
a stator coupled between the housing and the rotor, surrounding the rotor, and having at least one coil,
wherein the rotor comprises a rotating shaft having a first blade on an outer circumferential surface thereof, and further comprises a second blade detachably coupled to the rotating shaft,
wherein the first blade is rotatably coupled to the rotating shaft, and
the rotating shaft comprises a first rotary member moved by pressure of the fluid flowing into the housing and a second rotary member having one side coupled to the first rotary member and the other side coupled to the first blade,
wherein the hybrid generator further comprises:
a first ball joint coupled between the first and second rotary members, and
a second ball joint coupled between the second rotary member and the first blade,
wherein a blade rotating shaft coupled to the second ball joint is provided at one end of the first blade,
wherein the second ball joint is engaged at a position eccentric from a center of a cross section of the blade rotating shaft,
wherein, when the second ball joint is coupled to an upper side with respect to the center of the cross section of the blade rotating shaft, a rotation angle of the first blade is increased when the second rotary member is moved vertically downward, and
when the second ball joint is coupled to a lower side with respect to the center of the cross section of the blade rotating shaft, the rotation angle of the first blade is decreased when the second rotary member is moved vertically downward.

2. The hybrid generator according to claim 1, wherein the housing comprises an upper housing and a lower housing detachably coupled to the upper housing.

3. The hybrid generator according to claim 2, wherein an auxiliary housing is further coupled to a side of the housing, and the auxiliary housing is provided with a battery that stores induced current generated by rotation of the rotor and an inverter that converts the induced current stored in the battery into alternating current.

4. The hybrid generator according to claim 3, wherein a sealing member made of an elastic material is coupled between the upper and lower housings, and
the upper and lower housings have a fitting groove into which the sealing member is fitted.

5. The hybrid generator according to claim 4, wherein planetary gears are coupled to the rotating shaft, and a ring gear that transmits rotational driving force to the planetary gears is further coupled to the rotating shaft, and
the rotating shaft, the planetary gears, and the ring gear are simultaneously driven to control a rotation speed of the rotating shaft.

6. The hybrid generator according to claim 2, wherein the upper and lower housings are coupled by a coupling member.

7. The hybrid generator according to claim 2, wherein a first rotating bearing is provided between the upper housing and the rotating shaft to support one side of the rotating shaft, and a second rotating bearing is provided between the lower housing and the rotating shaft to support the other side of the rotating shaft.

8. The hybrid generator according to claim 1, wherein a spring is further coupled between the second rotary member and the rotating shaft.

9. The hybrid generator according to claim 1, wherein a support bearing is coupled between the first blade and the rotating shaft to support rotation of the first blade.

10. The hybrid generator according to claim 1, wherein a coupling member to which the second blade is coupled is further provided at one end of the rotating shaft.

11. The hybrid generator according to claim 1, wherein the magnet is coupled to a periphery of the first blade, and is disposed to be inclined at a predetermined angle with respect to the coil.

12. The hybrid generator according to claim 11, wherein a charging terminal extending outside the housing is further provided on one side of the housing.

13. The hybrid generator according to claim 12, wherein the charging terminal is provided at least as a USB port, and the hybrid generator is connected to an auxiliary battery or an energy storage system (ESS) via the USB port and energy generated in the hybrid generator is stored in the auxiliary battery or the energy storage system (ESS).

14. The hybrid generator according to claim 13, wherein the charging terminal is provided with two electrode wires and at least one wire for preventing disconnection of the electrode wires.

15. The hybrid generator according to claim 1, further comprising:
a case in which the housing is received,
wherein the case is provided with a case solar cell.

16. The hybrid generator according to claim 15, wherein, when the housing is brought into close contact with a lower portion of the case to perform hydroelectric power generation,
the first blade is rotated by the fluid flowing into the housing when the case floats on water, and
a plurality of wires is coupled to the housing to prevent the housing from being swept away by water.

17. A hybrid generator, comprising:
a housing having an empty space through which a fluid flows;
a first rotor received inside the housing, provided with a first rotating shaft having a first blade on an outer circumferential surface thereof, rotated by the fluid flowing inside the housing, and having a magnet;
a stator coupled between the housing and the first rotor, surrounding the first rotor, and having at least one coil; and
a second rotor provided outside the housing, detachably coupled to the first rotating shaft, provided with a second rotating shaft having a second blade on an outer circumferential surface thereof, and rotated by a fluid flowing outside the housing,
wherein the housing comprises an upper housing and a lower housing detachably coupled to the upper housing,
wherein the first blade is rotatably coupled to the first rotating shaft, and
the first rotating shaft comprises a first rotary member moved by pressure of the fluid flowing into the housing and a second rotary member having one side coupled to the first rotary member and the other side coupled to the first blade,
wherein the hybrid generator further comprises:
a first ball joint coupled between the first and second rotary members, and
a second ball joint coupled between the second rotary member and the first blade,
wherein a blade rotating shaft coupled to the second ball joint is provided at one end of the first blade,
wherein the second ball joint is engaged at a position eccentric from a center of a cross section of the blade rotating shaft,
wherein, when the second ball joint is coupled to an upper side with respect to the center of the cross section of the blade rotating shaft, a rotation angle of the first blade is increased when the second rotary member is moved vertically downward, and
when the second ball joint is coupled to a lower side with respect to the center of the cross section of the blade rotating shaft, the rotation angle of the first blade is decreased when the second rotary member is moved vertically downward.

* * * * *